ns, resid-
UNITED STATES PATENT OFFICE.

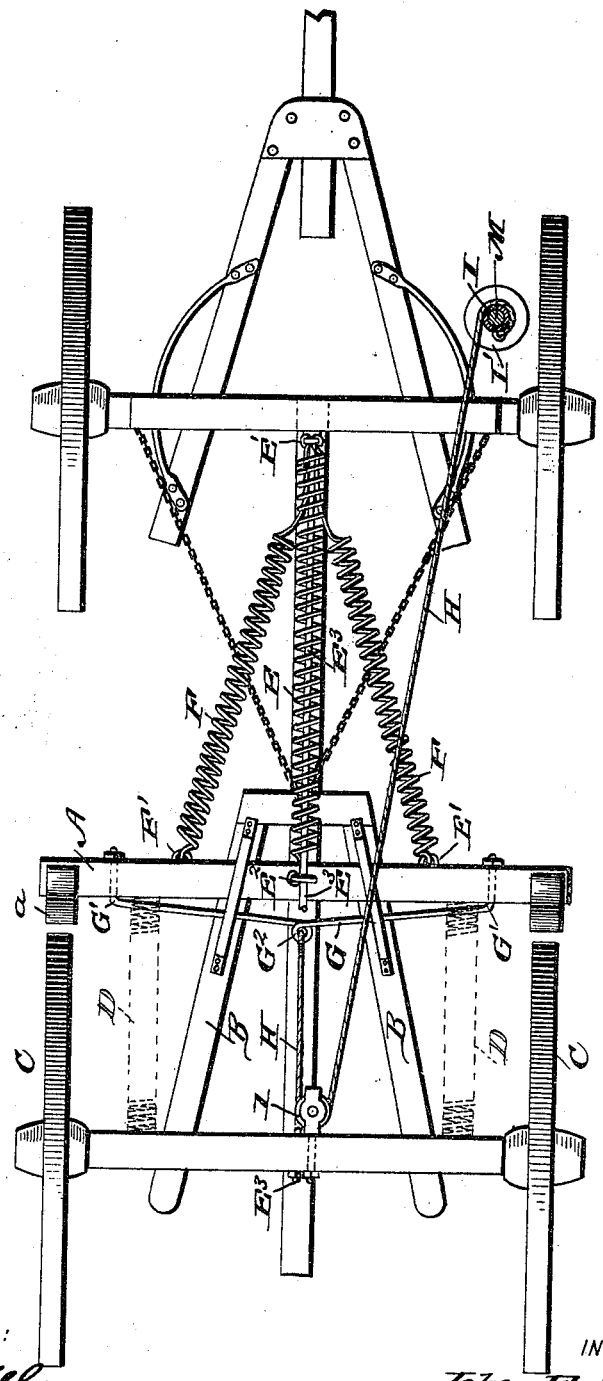

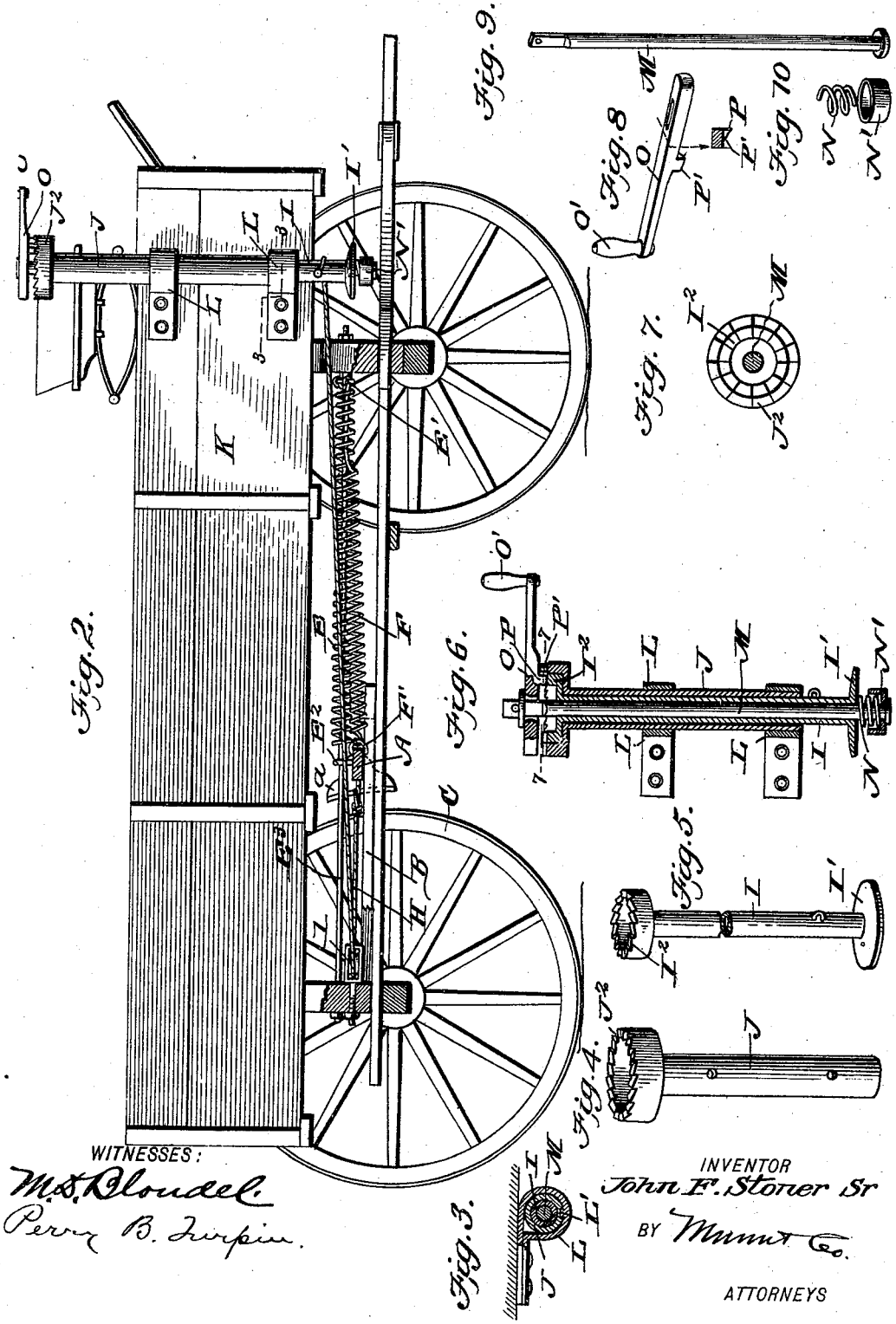

JOHN FREDERICK STONER, SR., OF NEAR DIXIE, INDIANA.

WAGON-BRAKE.

SPECIFICATION forming part of Letters Patent No. 683,866, dated October 1, 1901.

Application filed February 12, 1901. Serial No. 47,016. (No model.)

*To all whom it may concern:*

Be it known that I, JOHN FREDERICK STONER, Sr., a citizen of the United States, residing near Dixie, in the county of Harrison and State of Indiana, have made certain new and useful Improvements in Wagon-Brakes, of which the following is a specification.

This invention is an improvement in vehicle-brakes; and it consists in certain novel constructions and combinations of parts, as will be hereinafter described and claimed.

In the drawings, Figure 1 is a sectional plan view of a wagon provided with my improvement. Fig. 2 is a side view thereof. Fig. 3 is a sectional view on about line 3 3 of Fig. 2. Fig. 4 is a detail view of the bearing-sleeve. Fig. 5 is a detail view of the winding-drum. Fig. 6 is a detail vertical section alongside the operating-shaft and through the winding-drum and bearing-sleeve. Fig. 7 is a detail cross-sectional view on about line 7 7 of Fig. 6. Fig. 8 is a detail view of the lever. Fig. 9 is a detail view of the operating-shaft, and Fig. 10 is a detail view of the spring for operating the winding-drum and its cup.

The brake-bar A is slidable upon the hounds B and is provided at its ends with the shoes $a$ to brake the wheels C. This brake-bar A is held normally clear of the wheels C by means of springs, which may be arranged in rear of the brake-bar, as indicated in dotted lines at D in Fig. 1, but are preferably arranged as shown in full lines in said Fig. 1, consisting of the central spring E and the side springs F. The spring E is secured at its forward end at E' to the running-gear and at its rear end at $E^2$ to the brake-bar and is braced in position by the rod $E^3$, which passes through it, as shown. The brake-bar may be placed under the hounds also by a support to a piece of wood running across the top of the hounds by two long links. The springs F are secured at their rear ends at F' to the brake-bar at points between the middle thereof and its outer ends and are carried thence forward and inward toward the center of the wagon and are connected at their forward ends with the running-gear at or near the connection of the front end of the spring E, as shown. This construction operates efficiently to release the brake-bar from the wheels and holds the brake-bar in released position, so it will not chatter as the vehicle moves along.

The bail G is secured at its ends G' to the brake-bar A and extends in rear of such brake-bar, being provided at its middle with an eye $G^2$ for the connection of the operating-line H. This construction operates to prevent the quivering or trembling of the brake when applied. This line H extends from the eye $G^2$ rearwardly around the guide-pulley 1, as shown in Figs. 1 and 2, and thence forward to its connection with the winding-drum I. The drum I is provided at its lower end with a flange I' and has at its upper end a ratchet-ring $I^2$. This drum I is supported in the bearing-sleeve J, which is held from turning and is secured to the wagon-body K by means of the straps L, which pass around the bearing-sleeve J and are secured to the wagon-body by bolts or otherwise. Interlocking lugs or recesses may be provided at L' for preventing the sleeve J from turning in the part L, as shown in Fig. 3. This sleeve J is also provided at $J^2$ with a ratchet-ring, which is concentric with the ring $I^2$ and whose teeth are reversed relatively to those of the ring $I^2$, as is best shown in Figs. 4 and 5. The line H is connected with the drum I and may be a rope or chain, as preferred, and by turning the drum I the brake-bar may be operated to set the brakes. The shaft M fits within the winding-drum and extends at its opposite ends beyond such drum, as shown in Fig. 6. On the lower end of the shaft M, I arrange a spring N, operating within the cup N' and between the same and the flange I' of the drum I in such manner as to actuate the said sleeve upward. On the upper end of the shaft M is suitably secured a lever O, having a handle O' and provided with pawl-like projections P and P' for engaging, respectively, with the ratchet-rings $I^2$ and $J^2$. By the engagement of the pawl P with the ring $I^2$ the operation of the lever O may serve to turn the drum I in such manner as to wind up the line H and set the brakes, and the pawl-like portion P' may then be engaged with the ring $J^2$ to serve as a detent for holding the brakes set until it is desired to release the same. The lever or handle O is raised up to unlock without turning the handle, as this disengages the ratchet and the springs draw back the bar.

The construction is simple and easily operated, may be readily applied to the brake-bars now in use, and the arrangement of the springs, as shown and described, operates to throw the brake-shoes a considerable distance from the brake-wheels, which is an important feature in freezing weather.

It should be understood that my machine or brake is a good thing to operate a farm-gate as well as to brake a vehicle.

Having thus fully described my invention, what I claim as new, and desire to secure by Letters Patent, is—

1. The improvement substantially as described comprising the running-gear, the brake-bar, the central longitudinal spring for releasing the brake-bar, the diagonal side springs connected at their rear ends with the brake-bar near the ends of the latter and inclining thence inwardly to their forward ends and suitably secured at such ends, the bail arranged in rear of the brake-bar and connected at its outer ends therewith and provided at its middle with an eye for the connection of the operating-line, the operating-line, the operating-shaft, the winding-drum having a ratchet-ring at its upper end, the spring bearing between said drum and the shaft, the bearing-sleeve also provided with a ratchet-ring, and the handle-lever applied to the operating-shaft and having pawl-like portions engaging the ratchets of the winding-drum and bearing-sleeve, all substantially as set forth.

2. The combination substantially as described, of the operating-shaft, the winding-drum fitting upon the same and having a ratchet-ring, the bearing-sleeve fitting upon the winding-drum, the lever on the shaft and arranged to engage with the ratchet of the winding-drum to operate the same, said lever being also arranged to engage the bearing-sleeve to operate as a detent, substantially as set forth.

3. The combination of the operating-shaft, the winding-drum thereon and having a ratchet-ring, the spring bearing between said drum and shaft, the bearing-sleeve fitted over the winding-drum and having a ratchet-ring, and the lever connected with the operating-shaft and having portions engaging the ratchet portions of the winding-drum and bearing-sleeve, substantially as set forth.

4. The combination of the wagon-body, the brake-bar, devices for releasing the same, the bearing-sleeve having a ratchet-ring at its upper end, means for securing said sleeve to the wagon-body, the winding-drum fitted in the bearing-sleeve and provided at its upper end with a ratchet-ring and projecting at its lower end below the said sleeve, the brake-setting line connecting said projecting end of the drum with the brake-bar, the shaft in said drum and projecting below the same, the spring on said projecting portion of the shaft and arranged to actuate the drum upwardly, and the lever connected with the upper end of the shaft and having portions engaging the ratchet-rings of the drum and sleeve, substantially as set forth.

5. The combination substantially as described, of the shaft, the winding-drum thereon, having a ratchet-ring, the spring bearing between the shaft and drum, the bearing-sleeve having the ratchet-ring fitted over the drum, and the lever connected with the shaft and engaging the ratchet-rings of both the drum and sleeve, said ratchet-rings being reversed relatively, substantially as set forth.

6. The combination substantially as described, of the operating-shaft provided with a handle-lever, the winding-drum fitted over said shaft, and a bearing-sleeve in which said drum operates, substantially as set forth.

JOHN FREDERICK STONER, Sr.

Witnesses:
CHAS. B. ELLIS,
JOHN Y. HUDSON.